United States Patent [19]

Brems et al.

[11] Patent Number: 5,492,984
[45] Date of Patent: Feb. 20, 1996

[54] OLEFIN POLYMERIZATION CATALYST BASED ON MAGNESIUM CHLORIDE COMPLEXES

[75] Inventors: Patrick Brems, Worms, Germany; Guy L. G. Debras, Les-Bons-Villers, Belgium

[73] Assignee: Fina Research, S.A., Feluy, Belgium

[21] Appl. No.: 115,279

[22] Filed: Aug. 31, 1993

[30] Foreign Application Priority Data

Aug. 31, 1992 [EP] European Pat. Off. .............. 92870136

[51] Int. Cl.$^6$ ..................................... C08F 4/654
[52] U.S. Cl. ...................... 526/125.8; 502/169; 502/172
[58] Field of Search ..................... 502/169, 172; 526/125

[56] References Cited

U.S. PATENT DOCUMENTS 5,212,132  5/1993  Spitz et al. ............................. 502/134
5,212,133  5/1993  Duranel et al. .......................... 502/134

FOREIGN PATENT DOCUMENTS 3336761  5/1984  Germany .
2131033  6/1984  United Kingdom .

OTHER PUBLICATIONS

*Hawley's Condensed Chemical Dictionary,* 11th ed., Van Nostrand Reinhold, New York, 1989, pp. 424, 425, 607.

*Primary Examiner*—Romulo H. Delmendo
*Attorney, Agent, or Firm*— William D. Jackson; Jim D. Wheelington; M. Norwood Cheairs

[57] ABSTRACT

The present invention provides new magnesium chloride-cyclic ether complexes having utility as a component of Ziegler-Natta catalysts for the polymerization of olefins.

12 Claims, No Drawings

OLEFIN POLYMERIZATION CATALYST BASED ON MAGNESIUM CHLORIDE COMPLEXES

TECHNICAL FIELD OF THE INVENTION

The present invention relates to novel magnesium chloride compositions in which magnesium chloride is complexed with an ether. The present invention also relates to the use of these complexes in manufacturing high performance alpha-olefin polymerization catalysts. Further a process is provided for producing alpha-olefins polymers having a controlled morphology by using the magnesium chloride complexes of this invention.

BACKGROUND OF THE INVENTION

Activated magnesium chloride has long been important in the manufacture of high performance catalysts for making polyethylene and polypropylene. It is known in the art that anhydrous magnesium chloride must be activated by mechanical or chemical methods in order to obtain active polymerization catalysts.

Such activation methods typically include:

(i) treatment of $MgCl_2$ with activating agents such as electron donors;

(ii) ball milling of $MgCl_2$ and (iii) reaction of compounds such as Mg organic derivatives with chlorinating agents There exists a large number of patents concerning use of magnesium chloride in the manufacture of Ziegler-Natta olefin polymerization catalysts. The Ziegler-Natta catalysts seem to include every combination of a transition metal compound and an organometallic compound from groups I to III of the periodic table that will promote olefin polymerization. Magnesium precursors such as dialkyl magnesium, magnesium dialkoxides, alkyl magnesium alkoxides, alkoxy magnesium chloride and the like are being tested and some used extensively for preparing supported Z/N catalysts for polyolefin production. Although magnesium diethoxides (alkoxides) and commercial anhydrous magnesium chloride are the most extensively used solid magnesium precursors, many other magnesium precursors in solid and soluble form have been transformed by various treatments into activated magnesium chloride catalyst supports.

Belgian Patents 785332 and 785333 disclose high yield polymerization catalysts which are prepared from activated $MgCl_2$, $TiCl_4$ and internal electron donors, and activated by a mixture of trialkylaluminum and an external electron donor.

Recently compositions of magnesium chloride complexed with tetrahydrofuran (THF) were used in the manufacture of super high activity catalysts for olefin polymerization. In "Polymer Communications, 1988, vol. 29, number 5", P. Sobota et al have studied the reactions between $MgCl_2$ $(THF)_2$ and $TiCl_4$ $(THF)_2$ and their use as a component of the Ziegler-Natta catalyst for olefin polymerization.

It is also known in the art that a control of the polymer particle morphology is very important for the plant operability and the transformation of the polymer. Therefore it would be useful to have a polymerization catalyst and process whereby a polymer with a controlled particle size distribution could be produced.

Commercial anhydrous magnesium chloride contains impurities which cannot easily be removed. Further commercially available magnesium chloride is usually crystalline and thus exhibits a low activity. As such, polymer manufacturers often use synthetic routes to $MgCl_2$ in an attempt to obtain a 100% active $MgCl_2$. It would be useful, however, to find a process which enables the use of commercial anhydrous magnesium chloride in the preparation of polymerization catalysts.

SUMMARY OF THE INVENTION

The present invention relates to magnesium chloride compositions in which magnesium chloride is complexed with an ether. The present invention also is directed to high performance alpha-olefin polymerization catalysts. Further, the present invention also provides a process for producing alpha-olefin polymers having a controlled morphology.

According to the present invention, a magnesium chloride complex is prepared by dissolving magnesium chloride ($MgCl_2$) in a solvent, reacting the $MgCl_2$ with a cyclic ether (E) and recovering a $MgCl_2.E$ complex which is insoluble in the solvent.

Among the cyclic ethers E which can be used according to the present invention one will preferably use those selected from 1,3-dioxolane (DXL), 1,4-dioxane (DXN), 2-methyltetrahydrofuran (MTHF) and tetrahydropyran (THP). More preferably DXL or DXN will be chosen, DXL being the most preferred.

The solvent used according to the present invention can be any aprotic hydrocarbon that is inert to the reaction. It is preferred that the hydrocarbon solvent be aliphatic, alicyclic or aromatic. The hydrocarbon solvent used can be selected from n-hexane, n-heptane, cyclohexane, methylcyclohexane, benzene, toluene and other commonly used inert hydrocarbon solvents.

According to a preferred embodiment of the present invention, the solvent is identical to the cyclic ether E. When using the cyclic ether E as a solvent of $MgCl_2$, the Applicant has found that the resulting $MgCl_2.xE$ complex is insoluble in its solvent. This represents a considerable advantage since the complex can be recovered by simple filtration.

The $MgCl_2$ used according to the present invention can be prepared by any of the methods known in the art. For example, $MgCl_2$ can be prepared according to the in-situ method disclosed by E. C. Ashby in "J. Organometallic Chemistry, 1968, vol. 14, p. 1". However, according to a preferred embodiment of the present invention commercial anhydrous magnesium chloride is used which represents a big advantage for the preparation of the Ziegler-Natta catalyst.

The present invention also provides a process for the polymerization of alpha-olefins having 2 to 20, preferably 2 to 8, carbon atoms characterized by the fact that the polymerization is carried out in the presence of a Ziegler-Natta catalyst which is prepared with a magnesium chloride complex obtained according to the present invention.

DETAILED DESCRIPTION

The Applicant has unexpectedly found that polymerization of alpha-olefins in the presence of a Ziegler-Natta catalyst prepared according to the present invention results in a high polymerization activity per unit quantity of the catalyst component. Further the polymer fluff obtained according to the present invention is under the form of spherical particles. It is another advantage of the present invention because this is synonymous with an improved plant operability and this permits to transform the polymer directly into manufactured items, thus avoiding the expensive process of pelletizing.

The Ziegler-Natta catalysts of the present invention utilizes a magnesium chloride complex of this invention together with a compound of a metal selected from Groups IV-B and V-B of the Periodic Table of the Elements. Preferred metal compounds are those of titanium, vanadium and zirconium. Examples of the titanium compound used in the present invention include halides, alkoxyhalides, alkoxides and halogenated oxides, of titanium. As preferred examples of the titanium compound, there may be mentioned tetravalent and trivalent titanium compounds. As tetravalent titanium compounds, those represented by the general formula $Ti(OR)_y X_{4-y}$ are preferred wherein R is a hydrocarbon radical such as an alkyl, aryl or aralkyl group having 1 to 24 carbon atoms, X is a halogen atom and $0 \leq y \leq 4$, such as titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As trivalent titanium compounds, there may be used, for example, titanium trihalides obtained by reducing titanium tetrahalides such as titanium tetrachloride and titanium tetrabromide with hydrogen, aluminum, titanium or an organometallic compound of a Group I–III metal in the Periodic Table, as well as trivalent titanium compounds obtained by reducing tetravalent alkoxytitanium halides represented by the general formula $Ti(OR)_s X_{4-s}$ with an organometallic compound of a Group I–III metal in the Periodic Table, in which formula R is a hydrocarbon radical such as an alkyl, aryl or aralkyl group having 1 to 24 carbon atoms, X is a halogen atom and $0<s<4$.

More preferably the catalyst used according to the present invention is a $TiCl_4/MgCl_2.xE$ compound.

The Ziegler-Natta catalysts of the present invention usually utilizes as cocatalyst an organometallic compound from groups I to III of the periodic table that will promote olefin polymerization. Preferably, those cocatalysts are selected from aluminum alkyls, more preferably triethylaluminum.

According to an embodiment of the present invention an electron donor compound can be added to the cocatalyst in order to improve the catalyst performance. Among the various electron donor compounds which can be used, one can cite those disclosed in Belgian Patents 785332 and 785333 which are enclosed herewith by reference.

The following examples further illustrate the invention, but are not intended to limit the scope thereof.

EXAMPLES

All manipulations were performed under nitrogen atmosphere.

Anhydrous magnesium chloride was obtained either from Aldrich Chemicals or from Toho Titanium and used without further purification.

Anhydrous cyclic ethers and titanium (IV) were obtained from Aldrich Chemicals.

EXAMPLE 1

Preparation of $MgCl_2.DXL$ Complex

A 500 ml round bottom flask equipped with a magnetic stirring bar, a reflux condenser and a nitrogen inlet was charged with 2 g of anhydrous $MgCl_2$ in 200 ml of 1,3-dioxolane.

The temperature of the reaction mixture was subsequently increased by means of heating bath to the boiling point of dioxolane while vigorous stirring. While reflux proceeded the solution became turbid. After 3 hours at this temperature, the mixture was allowed to reach the room temperature and the solid formed was separated by filtration from the supernatant solution and dried under vacuum. 4.24 g of a white solid was obtained. After evaporation of the dioxolane solution, hardly any solids remained.

COMPARATIVE EXAMPLE C 1

Preparation of $MgCl.2THF$ Complex

A 1 l round bottom flask equipped with a magnetic stirring bar, a reflux condenser and a nitrogen inlet was charged with 5 g of anhydrous $MgCl_2$ in 500 ml of tetrahydrofuran.

The temperature of the reaction mixture was subsequently increased by means of heating bath to 80° C. While reflux proceeded all the magnesium chloride solubilized. After one night at this temperature, a clear solution was obtained. After evaporation of the THF and drying, 12.3 g of white solid was obtained.

EXAMPLES 2 TO 4

Three different magnesium chloride complexes were prepared according to the procedure indicated in Example 1 with characteristics mentioned in Table 1.

TABLE 1

| Example | Mg Compound | Ether Compound | Reaction temperature | Reaction time |
| --- | --- | --- | --- | --- |
| 1 | $MgCl_2$, 2 g | 1,3-dioxolane, 200 ml (DXL) | 90° C. | 3 hr |
| 2 | $MgCl_2$, 2 g | 1,4-dioxane, 125 ml (DXN) | 120° C. | 4 hr |
| 3 | $MgCl_2$, 2 g | 2-methyltetrahydrofuran, 150 ml (MTHF) | 80° C. | 6 hr |
| 4 | $MgCl_2$, 2 g | tetrahydropyran, 200 ml (THP) | 85° C. | 4 hr |
| C1 | $MgCl_2$, 5 g | tetrahydrofuran, 500 ml (THF) | 80° C. | 18 hr |

EXAMPLE 5

Catalyst Preparation

In a glove box with nitrogen atmosphere, a 100 ml round bottom flask equipped with a magnetic stirring bar and a reflux condenser was charged with 2 g of $MgCl_2.DXL$ (prepared according to Example 1) suspended in 20 ml of $TiCl_4$.

The content of flask was refluxed for 1 hour while stirring. At this point, the solid was separated by filtration without previous cooling and contacted with another 20 ml of $TiCl_4$ (1 hour, reflux temperature). After filtration, the solid so obtained was washed once with n-heptane, then suspended in 50 ml n-heptane and refluxed overnight. After cooling to room temperature the solid was filtered, washed once with n-heptane and dried under vacuum (1.11 g solid).

Ethylene Polymerization

A Büchi reactor (2 l) was filled with hydrogen (10 Nl), isobutane (0.5 l) and ethylene until a final reactor pressure of 30 bars was reached. Then a mixture of 10 mg catalyst (suspended in 4 ml mineral oil) and triethylaluminum (TEA) (2.1 ml) (1.9M in toluene), precontacted for 30 seconds, was introduced into the reactor by means of a second amount of isobutane (0.5 l). Then polymerization was carried out at 90° C. under a constant ethylene pressure of 39 bars for 1 hour. After the polymerization was stopped, polyethylene fluff was collected in the amount and with properties as specified in Table 2.

The polymer melt index ($MI_2$) and high load melt index (HLMI) were determinated following ASTM D 1238-89.

The polymer density was determinated following ASTM D 1505-85.

TABLE 2

| Catalyst | Cocatalyst | (Polymerization) Productivity (g PE/g.hr) | $MI_2$ (g/10') | HLMI (g/10') | Density (g/cc) | MWD | Fluff aspect |
| --- | --- | --- | --- | --- | --- | --- | --- |
| $MgCl_2.2$ THF/$TiCl_4$, 10 mg | TEA, 2.1 ml | 6.000 | 2.24 | 66.5 | 0.9566 | 5.0 | Powder |
| $MgCL_2.x$ DXL/$TiCl_4$, 10 mg | TEA, 2.1 ml | 4.000 | 3.59 | n.d. | 0.9602 | 4.3 | Spherical particles | n.d.: not determinable

We claim:

1. A process for producing a magnesium chloride complex incorporating a ziegler-natta catalyst comprising:
   a) dissolving magnesium chloride ($MgCl_2$) in a solvent and reacting the ($MgCl_2$) with 1,3 dioxolane under reaction conditions whereby a $MgCl_2.1.3$ dioxolane complex is formed;
   b) recovering the $MgCl_2.1.3$ dioxolane complex which is insoluble in the solvent, and
   c) combining said $MgCl_2.1.3$ dioxolane complex with a ziegler-natta catalyst to produce an olefin polymerization catalyst.

2. Process according to claim 1 wherein the solvent is 1.3 dioxolane.

3. A process for the polymerization of alpha-olefins in the presence of a Ziegler-Natta catalyst which is prepared with a magnesium chloride complex obtained according to claim 1 comprising contacting an alpha olefin with said catalyst under reaction conditions to produce a polymer of said alpha olefin.

4. Process according to claim 3 wherein the polymer obtained is in the form of spherical particles.

5. The process of claim 1, wherein said ziegler-natta catalyst incorporates a group IVB or group VB transition metal.

6. The process of claim 1, wherein said transition metal is selected from the group consisting of titanium, vanadium, and zirconium.

7. The process of claim 6, wherein said transition metal is titanium.

8. The process of claim 7, wherein said transition metal is a halide, alkoxyhalide, alkoxide, or halogenated oxide of titanium.

9. The process of claim 8, wherein said transition metal catalyst is titanium tetrachloride.

10. The process of claim 3, wherein said alpha olefin has from 2–8 carbon atoms.

11. The process of claim 10, wherein said alpha olefin comprises ethylene.

12. The process of claim 11, wherein the polymer produced is polyethylene in the form of spherical particles.

* * * * *